United States Patent [19]

Kobayashi

[11] Patent Number: 4,922,483
[45] Date of Patent: May 1, 1990

[54] MULTI-CHANNEL PCM MUSIC BROADCASTING SYSTEM

[75] Inventor: Hirokazu Kobayashi, Urawa, Japan

[73] Assignee: Kabushiki Kaisha Kenwood, Tokyo, Japan

[21] Appl. No.: 250,721

[22] Filed: Sep. 29, 1988

[30] Foreign Application Priority Data

Oct. 2, 1987 [JP] Japan .................... 62-247994

[51] Int. Cl.⁵ ............................ H04J 4/00
[52] U.S. Cl. ..................... 370/50; 370/73; 381/81
[58] Field of Search .......... 370/50, 73, 124, 69.1, 370/76, 110.1, 53; 381/77, 80, 81

[56] References Cited

U.S. PATENT DOCUMENTS

| | | | |
|---|---|---|---|
| 3,370,128 | 2/1968 | Morita et al. | 370/50 |
| 3,471,646 | 10/1969 | Magnuski et al. | 370/50 |
| 4,677,686 | 6/1987 | Hustig et al. | 370/73 |
| 4,704,715 | 11/1987 | Shibagaki et al. | 370/50 |

*Primary Examiner*—Douglas W. Olms
*Attorney, Agent, or Firm*—Sixbey, Friedman, Leedom & Ferguson

[57] ABSTRACT

In multi-channel PCM music broadcasting system, a plurality of blocks are time division multiplexed, each block having at least one music channel for a PCM formatted music signal and having an independent operation mode information. The time division multiplexed signal modulates a carrier, and a plurality of time division multiplexed signals each having a frequency shift from the carrier are frequency division multiplexed for transmission. The operation mode information for the plurality of blocks is collectively inserted in a time division multiplexed frame, an operation mode information for the plurality of time division multiplexed signals each having a frequency shift is exchanged among a plurality of time division multiplexing units, and both the operation mode informations are commonly inserted in the time division multiplexed frame for transmission. Upon designation of a music channel at a receiver side, both the operation mode informations are referred to to select a particular frequency and block including the designated music channel.

6 Claims, 4 Drawing Sheets

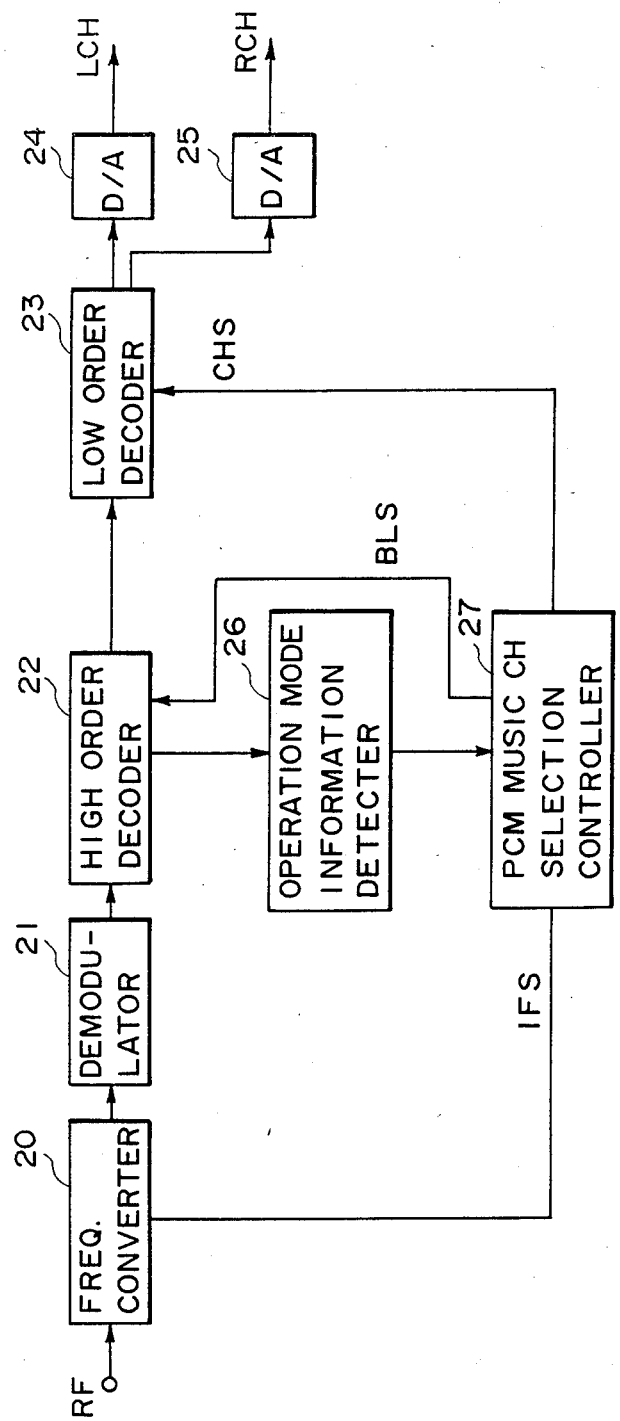
F I G. 2

FIG. 4A

| TV CH. PROGRAM INFORMATION | LOW ORDER HEADER (A BLOCK) | LOW ORDER HEADER (B BLOCK) | LOW ORDER HEADER (C BLOCK) | LOW ORDER HEADER (D BLOCK) |
|---|---|---|---|---|

FIG. 4B

| FRAME SYNC. PATTERN DATA | HIGH ORDER HEADER H(X) (Y=I,II,III) | MULTIPLEXED DATA 4 BLOCKS D(X) |
|---|---|---|

← N BITS →

FIG. 4C

| MULTIPLEXED DATA (4 BLOCKS) | FRAME SYNC. PATTERN DATA | HIGH ORDER HEADER H(I) | MULTIPLEXED DATA (4 BLOCKS) | FRAME SYNC. PATTERN DATA | HIGH ORDER HEADER H(II) | MULTIPLEXED DATA (4 BLOCKS) |
|---|---|---|---|---|---|---|

D(X)t−1    H(I)    D(X)t    H(II)    D(X)t+1

← HIGH ORDER COMMON HEADER SUBFRAME PERIOD →

FIG. 4D

| FRAME SYNC. PATTERN DATA | HIGH ORDER HEADER H(III) | MULTIPLEXED DATA (4 BLOCKS) | FRAME SYNC. PATTERN DATA | HIGH ORDER HEADER H(I) | MULTIPLEXED DATA (4 BLOCKS) |
|---|---|---|---|---|---|

H(III)    D(X)t+2    H(I)    D(X)t+3

MULTI-CHANNEL PCM MUSIC BROADCASTING SYSTEM

BACKGROUND OF THE INVENTION 1. (Field of the Invention)

The present invention relates to a multi-channel system, particularly a multi-channel PCM music broadcasting system wherein a plurality of blocks are time division multiplexed collectively, each block having at least one music channel and having a different operation mode information such as the number of music channels, music signal bandwidth, quantization bit number and the like, the time division multiplexed signal modulates a carrier, and a plurality of time division multiplexed signals each having a frequency shift from the carrier are collectively frequency division multiplexed for transmission.

2. (Description of the Related Art)

Since the frequency bandwidth of a television channel is about 6 MHz, the number of music channels in a multi-channel PCM music broadcasting is limited in transmission using CATV installations now available. Since a multi-channel PCM music signal must be transmitted at higher transmission rate, the occupied bandwidth becomes broad. As above, the frequency bandwidth of a television (TV) channel is not sufficient for transmission of multi-channeled PCM music signals. In view of the above, conventionally, first a few channel music signals within the television bandwidth are time division multiplexed. The time division multiplexed signal modulates a carrier. Several time division multiplexed signals obtained in the similar manner using several TV channels are frequency division multiplexed for transmission.

Therefore, if a music channel is to be tuned at a receiver side, first a corresponding TV channel frequency is selected. Next, a corresponding block among a plurality of blocks is selected. Lastly, the music channel desired to be tuned is selected from the selected block. The above procedure is cumbersome in selecting a desired music channel.

Further, if the operation mode prior to the time division multiplexing is changed, the procedure for selecting a desired music channel becomes more complicated.

SUMMARY OF THE INVENTION

It is an object of the present invention to solve the above problems and provide a multi-channel PCM music broadcasting system capable of selecting a desired music channel easily at a receiving side.

According to an aspect of the present invention, the multi-channel PCM music broadcasting system of the type that a plurality of blocks are time division multiplexed collectively, each block having at least one music channel of a PCM formatted music signal and having an independent operation mode information, said division multiplexed signal modulates a carrier, and a plurality of time division multiplexed signals each having a frequency shift from the carrier are collectively frequency division multiplexed for transmission, wherein said operation mode information for said plurality of blocks is collectively inserted in a time division multiplexed frame, an operation mode information for said plurality of time division multiplexed signals each having a frequency shift is exchanged among a plurality of time division multiplexing units, and both said operation mode informations are commonly inserted in said time division multiplexed frame for transmission, and wherein upon designation of said music channel at a receiver side, both said operation mode informations are referred to to select a particular frequency and block including the designated music channel.

The operation mode information for several blocks to be transmitted is collectively inserted in a time division multiplexed frame, an operation mode information for a plurality of time division multiplexed signals is exchanged among a plurality of time division multiplexing units, and both the operation mode informations are commonly inserted in the time division multiplexed frame form transmission. Therefore, upon designation of a music channel at a receiver side, both the operation mode informations are referred to to select a particular frequency and block including the designated music channel.

BRIEF DESCRIPTION OF THE DRAWINGS

FIG. 2 is a block diagram showing an embodiment of the arrangement of a receiver according to the present invention;

FIGS. 4A to 4D show formats of a high order header, time division multiplexed frame, and time division multiplexed transmission frame to be used for explaining the present invention.

DETAILED DESCRIPTION OF THE PREFERRED EMBODIMENT

The embodiment of the present invention will now be described with reference to the accompanying drawings.

Figure 1:
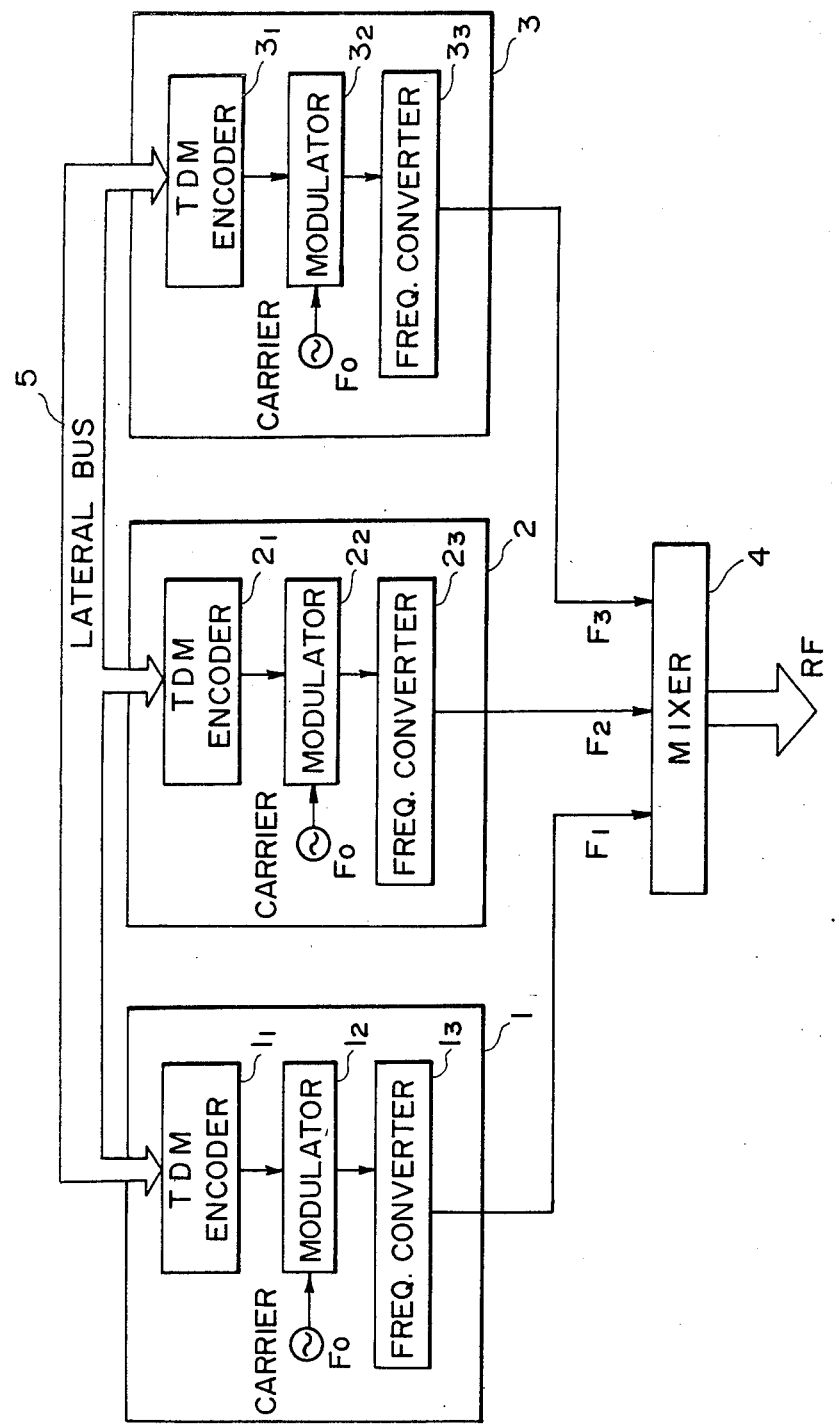
FIG. 1 is a block diagram showing an embodiment of the arrangement of a transmitter according to the present invention.

FIGS. 1 and 2 are block diagrams showing an embodiment of a multi-channel PCM music broadcasting transmitter and a multi-channel PCM music broadcasting receiver, respectively. Music channels are broadcasted using CATV installations presently available.

In this embodiment, the number of information blocks to be time division multiplexed is "4" and the number of frequency multiplexed sub-carriers is "3", by way of example.

Referring to FIG. 1, time division multiplexing units (TDM units) are generally indicated by reference numerals 1, 2 and 3. In this embodiment, a music source having one or more music channels is called a block. Four blocks are time division multiplexed by a time division multiplexing encoder $1_1$, and a carrier (frequency F0) is modulated with the time division multiplexed signal by a modulator $1_2$. The modulated signal is converted into a signal having a frequency F1 by a frequency converter $1_3$. Similarly, in the time division multiplexing units 2 and 3, four blocks are time division multiplexed and converted into signals having frequencies F2 and F3. Signals at frequencies F1, F2 and F3 are supplied to a mixer 4 and frequency multiplexed to be transmitted onto a cable. The time division multiplexing units 1, 2 and 3 each correspond to one TV channel. Thus, the mixer 4 frequency multiplexes three TV channels.

In order to make a high order header composed of an operation mode information of each block sent from the time division multiplexing units 1, 2 and 3, and TV channel program information, each time division multiplexing unit 1, 2, 3 sends its own operation mode information to the other units and receives the operation mode information of the other units, via a lateral bus 5.

Figure 3:
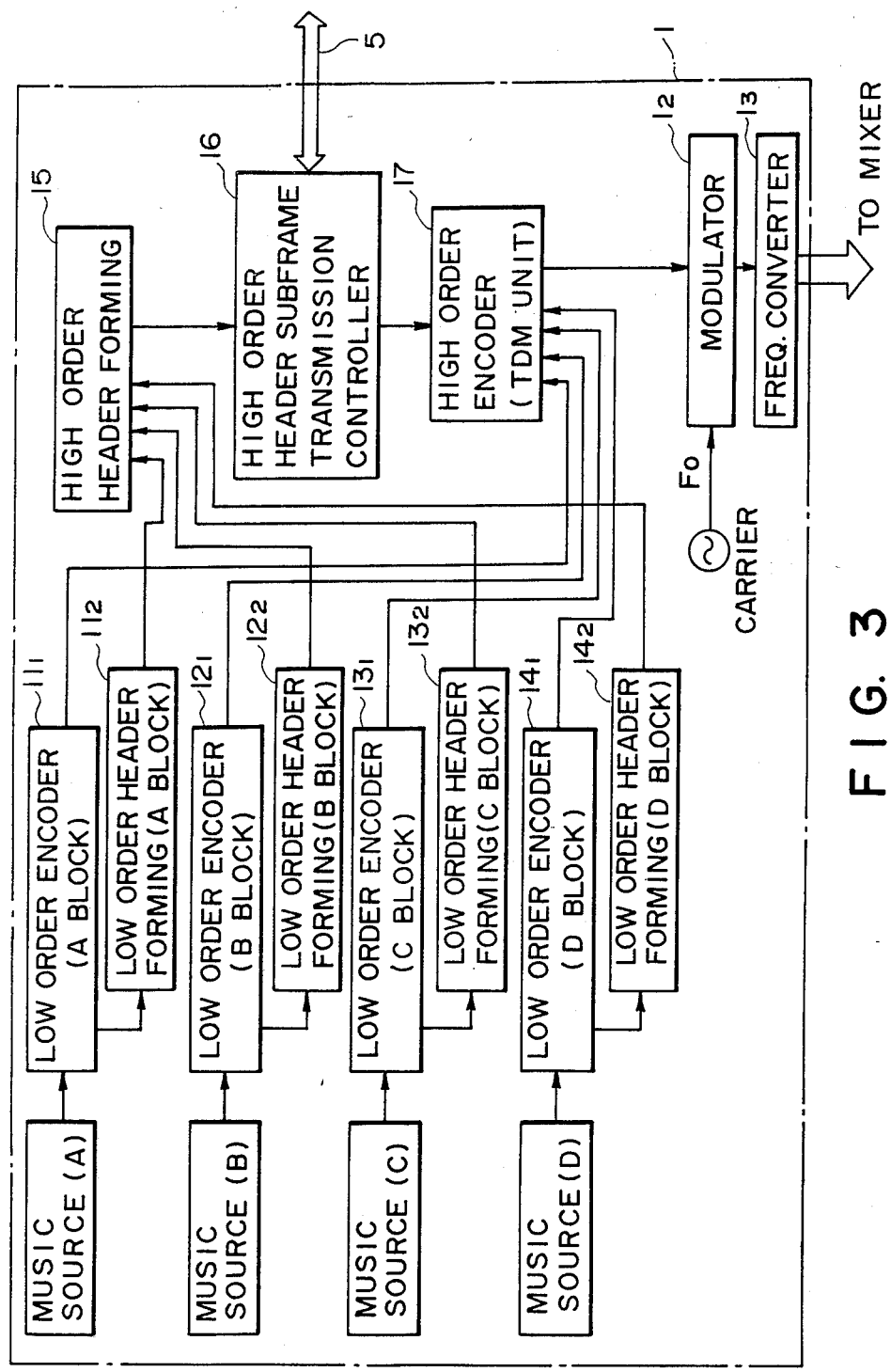
FIG. 3 is a block diagram showing the arrangement of the time division multiplexed unit shown in FIG. 1.

The time division multiplexing encoder $1_1$ of the time division multiplexing unit 1 will be described by way of example and with reference to FIG. 3.

The signal of music channels constituting each block of respective music sources A, B, C and D may be analog or digital. A signal of music channels constituting the music source A is supplied to a low order encoder $11_1$ to be subjected to encoding such as bit interleaving, adding error correction code and the like. The signal thus PCM formatted is sent to a high order encoder 17. Similarly, signals of the other music sources B, C and D are subjected to encoding at low order encoders $12_1$, $13_1$ and $14_1$, and the PCM formatted signals are sent to the high order encoder 17.

The operation mode information regarding music channel signals inputted to the low order encoder $11_1$ is collected at a low order header forming unit $11_2$ and sent to a high order header forming unit 15 as an A block low order header. Similarly, the operation mode informations regarding the other music channel signals inputted to the low order encoders $12_1$, $13_1$ and $14_1$ are collected respectively at low order header forming units $12_2$, $13_2$, and $14_2$ and sent to the high order header forming unit 15 as B, C and D block low order headers.

Upon reception of the low order headers from the low order header forming units $11_2$ to $14_2$, the high order header forming unit 15 generates a high order operation mode information or high order header having a format as shown in FIG. 4A, using the TV channel program information corresponding to frequencies F1, F2 and F3 converted by the frequency converters $1_3$, $2_3$ and $3_3$, and using the operation mode information from the low order header forming units $11_2$ to $14_2$.

The high order header generated by the high order header forming unit 15 is sent to the high order encoder 17. PCM formatted music data at the low order encoders $11_1$ to $14_1$ are also sent to the high order encoder 17 whereat the four blocks are time-compressed four times and time division multiplexed. Thus, a series of signals having a time division multiplexed frame format as shown in FIG. 4B are generated. This format is composed of a frame synchronizing pattern data added at the high order encoder 17, high order header H(Y), where Y=I, II and III, and four multiplexed data blocks D(X).

In this case, prior to performing the time division multiplexing at the high order encoder 17, the high order header is exchanged among the three time division multiplexing units 1 to 3 via the lateral bus 5 under control of a high header subframe transmission controller 16. The high order headers received from the other time division multiplexing units are sent to the high order encoder 17 every three frames whereat the high order headers H(I), H(II) and H(III) respectively for frequencies F1, F2 and F3 each are inserted within the corresponding frame, so that a time division multiplexed frame transmission format as shown in FIG. 4C is generated for transfer to the modulator. In the time division multiplexed frame transmission format shown in FIG. 4C, three time division multiplexed frame formats shown in FIG. 4B constitute a high order common header subframe period, wherein D(X)=D(l) for frequency F1, D(X)=(2) for frequency F2, and D(X) =D(3) for frequency F3. Namely, the high order headers formed at the high order header forming units 15 of the time division multiplexing units 1 to 3 are exchanged among the units 1 to 3 via the lateral bus 5 to thereby define the high order common header subframe period for each TV channel.

In the time division mulpexed frame format shown in FIG. 4B, four PCM formatted blocks each have independent (different or same) operation mode information are time division multiplexed. The time division multiplexed frame format is composed of the time division multiplexed frame synchronization pattern data at the head of the frame, the high order header made of four low order headers for respective blocks, and the four PCM formatted, time-compressed four times and time division multiplexed music (voice) information for the four blocks.

FIG. 4A shows the high order header made of the TV channel program information and four low order headers obtained at the high order header forming unit 15, prior to the time division multiplexing. The TV channel program information is added to the head of the high order header to discriminate the frequency of the TV channel after the frequency division multiplexing, the four low order headers for blocks A to D following the TV channel program information.

FIG. 4C shows the time division multiplexed frame transmission format to be subjected to frequency division multiplexing, the format being constructed of three time division multiplexed frame formats shown in FIG. 4B for allowing use of three TV channels. With the time division multiplexed frame transmission format, the operation mode information of each TV channel is sent every three high order headers. A signal having the time division multiplexed frame transmission format shown in FIG. 4C modulates the carrier (frequency F0) so that the signal corresponding to three TV channels is frequency division multiplexed by the mixer 4 and transmitted onto the cable.

Next, a multi-channel PCM music broadcasting receiver will be described with reference to the block diagram thereof shown in FIG. 2.

An incoming frequency division multiplexed signal sent via the cable from the mixer 4 is supplied to a frequency converter 20 whereat a TV channel is selected in accordance with a TV channel intermediate frequency selection (IFS) signal from a PCM music channel selection controller 20 to be described later, and the incoming signal is frequency converted into an intermediate frequency. An output signal from the frequency converter 20 is supplied to and demodulated by a demodulator 21. An output signal from the demodulator 21 is the time division multiplexed data encoded by the time division multiplexing encoder $1_1$, $2_1$ or $3_1$, the format thereof being the time division multiplexed frame transmission format shown in FIG. 4C.

The demodulated output by the demodulator 21, i.e., the time division multiplexed data having the format shown in FIG. 4C is sent via a high order decoder 22 to a low order decoder 23 and to an operation mode information detector 26 whereat the operation mode information is detected. The detected information is supplied to the PCM music channel selection controller 27 which holds all the operation mode information of three TV channels so that even if a particular TV channel is being tuned, the operation mode of the other TV channels can be known.

As a particular music channel is designated upon actuation of the PCM music channel selection controller 27, the controller 27 outputs a TV channel intermediate frequency selection (IFS) signal to the frequency converter 20, in accordance with the TV channel program information in which program the designated music channel is contained. Thus, the TV channel program including the designated music channel can be selected.

Next, the PCM music channel selection controller 27 outputs a block separation signal (BLS) to the high order decoder 22 for separation of a necessary block including the designated music channel. The block signal separated by the high order decoder 22 is expanded to recover the original time domain and thereafter, the expanded block signal including the designated music channel is supplied to the low order decoder 23.

Lastly, the PCM music channel selection controller 27 outputs a channel selection (CHS) signal to the low order decoder 23 to select the objective music channel.

As above, with a simple operation to designate a music channel upon actuation of the controller 27, the corresponding TV channel program and block can be identified and the designated music channel can be selected.

Since the operation mode information detected by the detector 26 and inputted to the controller 27 includes the operation mode information for all the TV channels, even if a different TV channel and block is being received, the designated music channel can be selected.

The selected music channel is supplied to D/A converters 24 and 25 and converted into analog signals. In this case, even if a different sampling frequency is used for a selected music channel, the sampling frequency is changed to an appropriate frequency in accordance with the channel selection CHS signal.

As appreciated from the foregoing description of the present invention, in a multi-channel PCM music broadcasting system of the type that a plurality of blocks are time division multiplexed collectively, each block having at least one music channel and having a different operation mode information (such as the number of music signal channels, signal bandwidth, quantization bit number and the like), the time division multiplexed signal modulates a carrier, and a plurality of time division multiplexed signals each having a frequency shift from the carrier are collectively frequency division multiplexed for transmission, the operation mode information for said plurality of blocks is collectively inserted in a time division multiplexed frame, an operation mode information for the plurality of time division multiplexed signals each having a frequency shift is exchanged among a plurality of time division multiplexing units, and both the operation mode informations are commonly inserted in the time division multiplexed frame for transmission. Therefore, upon designation of a music channel at a receiver side, both the operation mode informations are referred to to select a particular frequency and block including the designated music channel.

What is claimed is:

1. A music broadcasting system comprising:
    a transmitter including,
        (a) a plurality of time division multiplex (TDM) units, each unit accommodating music source channels and multiplexing signals from the music source channels in TDM channels to produce a TDM signal; and
        (b) a frequency division multiplex (FDM) unit for multiplexing the TDM signals from said plurality of TDM units in assigned frequency bands to produce a FDM signal for transmission,
    wherein the TDM signal in each frequency band includes music data for music source channels accommodated by the TDM unit corresponding to the same frequency band and header data for music source channels accommodated by all the TDM units in the transmitter, and the header data includes operation mode information representative of association of the music source channel with the frequency band for every music source channel;
    a receiver including,
        (a) means for receiving the transmitted FDM signal for the selected frequency band;
        (b) means for reproducing the TDM signal in the selected frequency band;
        (c) means for detecting the header data in the selectively received TDM signal; and
        (d) control means responsive to the designation of the music source channel by an operator for identifying the frequency band associated with the designated music source by referring to the detected header data and controlling said receiving means to receive the transmitted FDM signal for the identified frequency band.

2. A music broadcasting system according to claim 1, wherein said header data further includes operation mode information representative of multiplexing format for each TDM unit and said control means in response to the multiplexing format in the detected header data controls said reproducing means to reproduce the signal of the designated music source channel.

3. A music broadcasting system according to claim 2, wherein said transmitter includes a bus linked to all the TDM units of mutually providing the header data among the TDM units.

4. A music broadcasting system according to claim 2, wherein the TDM unit in said transmitter includes an encoder for PCM-encoding the signal from the music source channel and said header data further includes operation information representative of PCM-encoding format for the same music source channel.

5. A transmitter comprising:
    a plurality of time division multiplex (TDM) units, each unit accommodating music source channels and multiplexing signals from the music source channels in TDM channels to produce a TDM signal which includes music data and header data representative of TDM multiplexing format
    a bus connected to said plurality of TDM units for exchanging the header data among said plurality of TDM units so that the header data of the TDM signal for each TDM unit includes the TDM multiplexing formats of all said plurality of TDM units; and
    a frequency division multiplex (FDM) unit for multiplexing the TDM signals from said plurality of TDM units in assigned frequency bands to produce a FDM signal for transmission.

6. A transmitter according to claim 5, each TDM unit includes an encoder for PCM-coding the signal from music source channels accommodated by the same TDM unit and the header data further representing the PCM coding formats for respective music source channels.

* * * * *